May 8, 1962 W. O. ALEXANDER ETAL 3,032,985
DUAL ROTOR GOVERNOR
Filed July 27, 1960
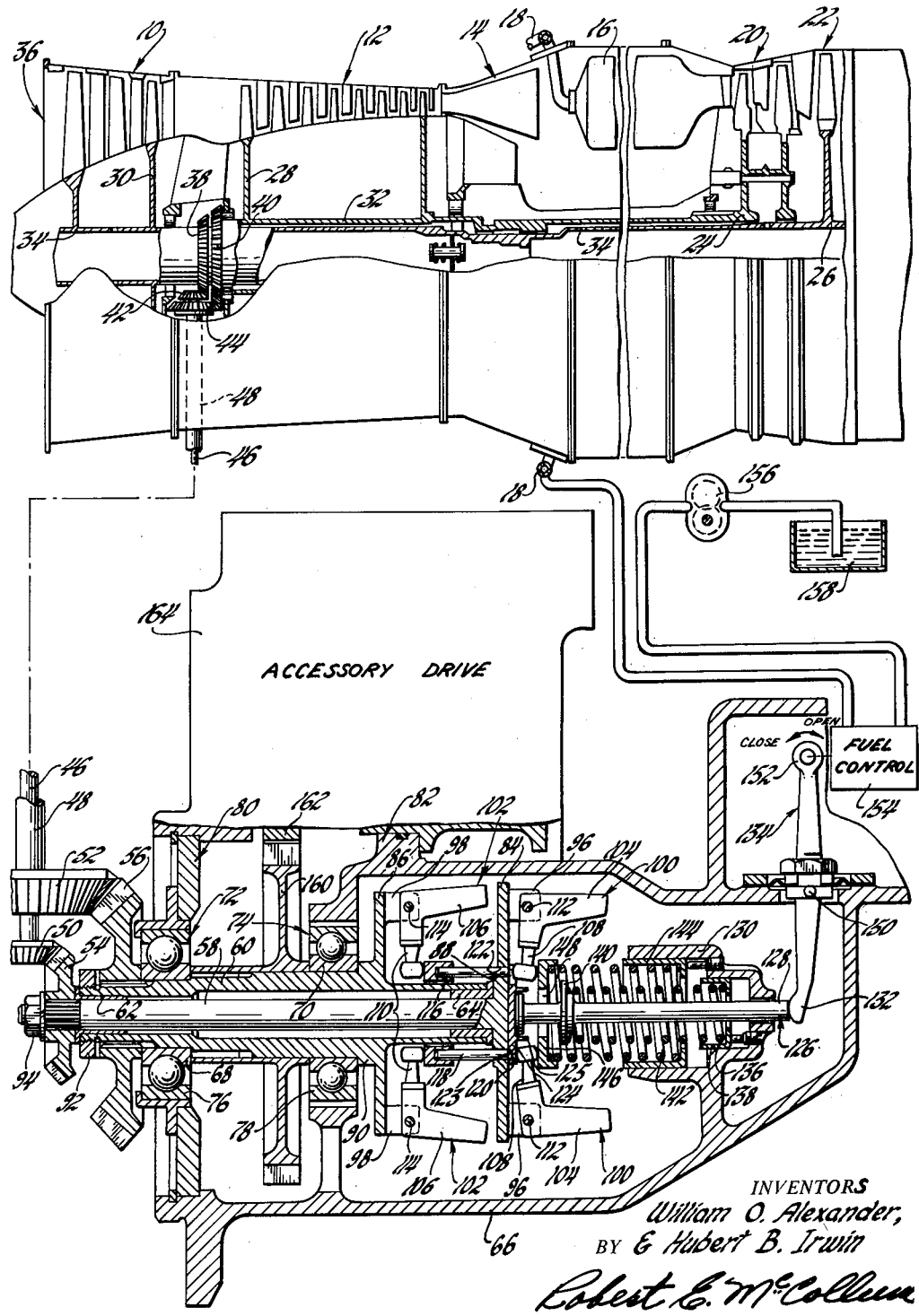
INVENTORS
William O. Alexander,
BY & Hubert B. Irwin
Robert E. McCollum
ATTORNEY United States Patent Office 3,032,985
Patented May 8, 1962

3,032,985
DUAL ROTOR GOVERNOR
William O. Alexander, Plainfield, and Hubert B. Irwin, Brownsburg, Ind., assignors to General Motors Corporation, Detroit, Mich., a corporation of Delaware
Filed July 27, 1960, Ser. No. 45,581
8 Claims. (Cl. 60—39.28)

This invention relates to a governing mechanism, and more particularly to an overspeed control for preventing overspeed of one of two rotating mechanisms relative to the other.

Certain turbine powered machines, such as a dual spool gas turbine engine, for example, contain two independently rotating rotors. The speed control of these two rotors generally comprises governing one rotor and merely providing overspeed protection for the other, the system usually requiring two speed sensing systems and two fuel valves in series.

This invention provides the concentric mounting of two speed sensing systems with respect to each other in a single housing, and with individual actuation of a common fuel valve, thus saving space, weight, and reducing the complexity of intercontrol between the two systems.

Therefore, it is an object of this invention to provide a speed control mechanism for a plurality of independently rotating mechanisms operable in response to overspeed of one of the mechanisms with respect to the other to independently control the speed of both mechanisms.

Other objects, features and advantages of the invention will be apparent upon reference to the succeeding detailed description of the invention, and to the drawing wherein the preferred embodiment thereof is schematically illustrated in connection with a dual rotor turbomachine.

The drawing illustrates the invention, in this instance, in connection with an axial flow type gas turbine engine of known type. The engine has independently rotating low and high pressure compressors 10 and 12 cooperating with a combustion chamber 14 having a number of liners 16 therein receiving fuel from a number of fuel nozzle assemblies 18.

The engine is further provided with independently rotating high and low pressure turbine sections 20 and 22 having rotors 24 and 26 driven by the products of combustion from the liners 16. The rotors in turn drive the corresponding rotors 28 and 30 of the high and low pressure compressors 12 and 10 through sleeve shaft type splined connections 32 and 34, respectively.

Thus, air taken in through the inlet 36 passes through both compressors 10 and 12 and into liners 16 where it is combined with the fuel and ignited. The exhausted combustion products then drive the two turbine rotors 24 and 26 to drive the two compressor rotors 28 and 30.

Further details of the engine beyond those already described are believed to be unnecessary as they are known and immaterial to an understanding of the invention.

As mentioned previously, the invention relates to an overspeed control for one of the turbines relative to the other to control the speeds of both by independent actuation of a common fuel valve.

To this end, the low and high pressure compressor drive shafts 34 and 32 have bevel gears 38 and 40 non-rotatably splined on the shafts and meshing with bevel gears 42 and 44 mounted on concentrically mounted shafts 46 and 48, shaft 48 telescopically surrounding shaft 46. Two bevel gears 50 and 52 are also fixed to the opposite ends of shafts 46 and 48 and mesh with bevel gears 54 and 56 slidably but non-rotatably splined to concentrically mounted low and high pressure compressor governor drive shafts 58 and 60. Shaft 60 telescopically surrounds shaft 58 and is rotatably separated therefrom at opposite ends by bearings 62 and 64. Shaft 60 rotates in a stationary housing 66 and has its opposite ends fixed to the inner races 68 and 70 of ball bearing units 72 and 74 having their outer races 76 and 78 secured by annular retainers 80 and 82 to the housing 66. Shafts 58 and 60 are both formed at one end with annular flanges 84 and 86 constituting base plates for the speed sensing devices to be described. Each of the plates has bosses 88 and 90 formed on one side and adapted to abut, respectively, the flanged end of bearing 64 in the one instance, and the edge of inner race 70 of bearing 74 in the other instance to maintain the axial position of the shafts in one direction relative to the housing and to each other. At the opposite ends of the shafts, a lock nut 92 abuts gear 56 against the inner race of bearing 72 to axially locate shaft 60, while a nut and washer combination 94 abuts gear 54 against bearing 62 to axially locate shaft 58.

Extending outwardly from each of the base plates 84 and 86 diametrically opposite from each other are two pairs of apertured ears 96 and 98. The ears 96 are angularly displaced from ears 98 with respect to the planes of the base plates to which they are attached for a purpose that will appear later. Pivotally supported between the pairs of ears are bell-crank shaped speed responsive weight members 100 and 102 of known type, each having predetermined calibrated weighted arms 104 and 106 and actuating arms 108 and 110. The weight members are arcuately movable variably under the effect of centrifugal force upon rotation of shafts 58 and 60 to swing about the pivots 112 and 114, the centrifugal force varying in a known manner with the square of the speed of rotation and the radial distance of the center of gravity of the weighted arm from the axis of rotation of the shafts.

High pressure turbine 24 is, in this illustration, the governed rotor. Therefore, the speed sensing system rotatable with shaft 60 actuates the fuel control to maintain the speed of turbine 24 in accordance with the power lever setting at all times. However, if, while turbine 24 is at the chosen speed, the low pressure turbine 26 overspeeds, the speed sensing system for shaft 58 independently actuates the fuel control to reduce the speed of both compressors, as will be described.

An annular collar 116 is rotatably and slidably mounted on one end of sleeve shaft 60 and is abutted by the actuating arms 110 of weight members 102. The collar is fitted at diametrically opposite points with four actuating plungers 118 having rounded ends 120 slidably inserted through aligned holes 122 in the base plate 84 of shaft 58. The ends are seated in suitably formed retaining dimples formed in four (only one shown) finger type flanges 123 extending radially from a floatingly mounted annular base plate 124. The four finger flanges are equally spaced from each other around the circumference of the base plate and are angularly displaced with respect to the ears 96 of plate 84 in the same manner as ears 96 are to ears 98. This angular or circumferential spacing from each other prevents interference between the axial actuation of the flanges 123 by speed weights 102 as will appear later, and the independent movement of weights 100. The collar 116, plungers 118 and plate 124 are driven at the speed of the low pressure compressor shaft 58, although the driving thereof is incidental to the invention and only for the particular actuation required.

The main body of base plate 124 has an annular flange 125 forming a cup-like bearing surface for receiving and guiding an end flange of a fuel lever actuating plunger 126. The opposite stem end 128 of plunger 126 slidably projects through a multi-cup-shaped extension 130 of the housing 66, and is adapted to abut one end 132 of a pivotally mounted fuel control lever 134. Plunger 126 is biased into engagement at all times with the base plate 124 by a compression spring 136 surrounding the stem of the plunger. The spring is seated at one end in a cup-like apertured retainer 138 adjustably secured as shown in the housing extension 130, and at its other end against the plunger base flange 140, the strength of the spring being chosen in accordance with design requirements. Surrounding spring 136 and plunger 126 is another compression spring 142 seated at one end against a cup-like apertured retainer 144 also adjustably mounted in the housing extension 130, and at its opposite end against an annular flanged plunger actuating plate 146. The spring floatingly supports and biases the plate 146 axially into abutting engagement with the actuating arms 108 of the low pressure compressor speed sensors 100. The plate 146 has a central hole 148 of a smaller diameter than the diameter of the base flange 140 so that the plate will engage the flange on overspeed of the low pressure compressor to independently move plunger 126, as will be described later.

The fuel lever 134 is pivotally mounted at 150 on the housing and is operatively connected at one end 152 to a fuel control system indicated schematically by the block 154. The fuel control is such that clockwise movement of the lever about the pivot variably opens the fuel flow to the fuel nozzles to increase the speeds of both the high and low pressure turbines and thus both compressors, while counterclockwise movement of the lever variably closes the fuel supply to decrease the speeds of the two compressors. The fuel lever is biased to its open position with its end 132 against the end of plunger 126 by spring means (not shown) in the fuel control 152.

While shown only schematically, the fuel control receives fuel from a fuel pump 156 supplied with fuel from a reservoir 158. The fuel control is adapted to feed fuel to the nozzle assemblies 18 in accordance with a predetermined schedule. Further details of the fuel system per se will not be given since they are believed to be unnecessary for an understanding of the invention and are known to those skilled in the arts to which the invention pertains. Suffice it to say, however, that the fuel control automatically supplies fuel in a known manner to the nozzles in accordance with a predetermined design acceleration and deceleration schedule as determined by engine requirements and the pilot's power lever setting. The movement of the power lever (not shown) to a particular speed selection position acts to control the speed of the governed turbine rotor by putting a pre-load on spring 136 in a known manner by means not shown, which could be, for example, a lost motion connection between the power lever and an axially slideable plate against which the end of the spring seats so that rotation of the power lever axially moves the plate to push against the spring. The pre-load varies in proportion to the speed setting selected and merely maintains the fuel lever in an open position until the governed rotor 24 attains the selected speed, as will be more fully described in connection with the description of the operation of the invention.

As shown in the figure, an accessory driving gear 160 is also splined on shaft 60 and meshingly drives other gearing 162 (only partially shown) for driving suitable accessories from the engine shaft, such as a fuel pump, for example, indicated generally by the block 164.

While a specified number of compressors, bevel gears, etc. have been indicated, i.e., two in this instance, it will be clear that the number is a matter of choice and design practice and therefore may be varied to suit the particular requirements and installation without departing from the scope of the invention.

Having described the details, the operation of this speed control system is as follows. With the engine shut down, the power lever (not shown) is in its "off" position exerting no preload on spring 136. The governor weights 100 and 102 nevertheless are biased to their innermost positions as shown by springs 136 and 142 acting against plunger 126 and plate 146. Fuel lever 134 will be in the position indicated. Thereafter, movement of the power lever by the pilot to the engine take-off position initially places a predetermined preload on spring 136, as described previously. Upon firing-up of the engine, the progressively increasing rotation of both turbines and compressors in an attempt to reach engine take-off speed rotates drive shafts 58 and 60 and the speed weights 100 and 102 progressively faster building up the centrifugal force acting on the weights to attempt to move the actuating arms 108 and 110 against the pre-load of spring 136 and the force of springs 136 and 142. Once centrifugal force balances the pre-load of spring 136 indicating the desired speed setting has been attained, any further increase in speed increases the centrifugal force on weights 104 and 106 and causes an arcuate swinging of both weights about their pivots. Arms 110 of weights 102 then axially slide collar 116 and plunger 126 against the spring 136 to move the fuel lever in a closing direction. Weights 100 meanwhile move plate 146 axially against the spring 142 without causing any actuation of plunger 126 since the flange 140 is moving axially at approximately the same rate or slightly less than the plate 146. The movement of plunger 126 therefore lowers the fuel flow rate and thereby decreases the speed of rotation of the rotors. This progressively decreases the centrifugal force on the weights until an equilibrium position of plunger 126 and fuel lever 134 is reached whereby the centrifugal force of the rotating weights just balances the preload of force of spring 136 to maintain the governed rotor at the selected compressor speed setting. Weights 100 and 102 are so calibrated that in normal operation, the high pressure compressor weights 102 always lead the low pressure weights 100 in their arcuate swinging movement. The governor weights 102 therefore move outwardly a fraction of a second sooner than the governor weights 100, assuming equal rotative speeds of the rotors, thereby maintaining a clearance between plate 146 and flange 140. In the event the low pressure turbine and compressor rotors should overspeed the high pressure rotors, then the faster rotation of shaft 58 relative to shaft 60 causes weights 100 to pivot further outwardly relative to the weights 102 moving the plate 146 by arms 108 against the force of spring 142 to abut flange 140 of plunger 126. Continued overspeed then causes the low pressure turbine and compressor weights 100 to take control or override the control of the movement of the fuel lever away from weights 102 by independently actuating the plunger 126 in opposition to the force of both springs to further close the fuel supply to prevent the top turbine and compressor speed at this time from exceeding the predetermined setting. The weights 102 at this time are ineffective. Of course, the opposite operation occurs if the engine slows down to too low a speed, i.e., the lower speed reduces the centrifugal force on the weights to a point where spring force and pre-load is greater than the centrifugal force resulting in the movement of the plunger 126 and fuel lever 134 to increase the fuel supply to speed up the rotors.

Other similar equilibrium seeking movements of the governing mechanisms occur upon moving the power lever to other speed settings, but are not described since the previous description is believed to be sufficient for an understanding of all operations. Suffice it to say that any increase or decrease or change called for in the speed of the high pressure turbine and compressor rotors as determined by the power lever requirements is automatically effected by the pivotal movement of the weights 102 independently of the rotative speed of the low pressure turbine and compressor rotors as long as the low pressure rotors do not overspeed the high pressure rotors. If an overspeed does occur, then weights 100 override the force of weights 102 and actuate the fuel lever independently of weights 102 to decrease the fuel supply until the speed of the faster rotating turbine and compressor is at or below the setting determined by the power lever position. It will be clear, of course, that if overspeed occurs prior to either turbines reaching the speed required by the power lever setting, no change in the position of the fuel lever will occur since the force of the pre-load on spring 136 will be greater than the centrifugal force acting on the faster rotating weights.

Therefore, it will be seen that this invention provides a control for positioning a single fuel control in response to two separate speed inputs. It will also be seen that this invention provides an overspeed control for preventing the overspeed of one of two independently rotating mechanisms relative to the other to control the speeds of both of said mechanisms.

While the invention has been described in its preferred embodiment in connection with a gas turbine engine, it will be clear to those skilled in the arts to which this invention pertains that many modifications may be made thereto and other uses made thereof without departing from the scope of the invention.

We claim:

1. Dual independently rotating mechanisms, actuatable means to effect rotation of said mechanisms, and control means to control said actuatable means to control overspeed of one of said mechanisms relative to the other, said control means including separate moveable speed responsive means connected to each of said mechanisms for rotation therewith, other means connecting said actuatable means and both of said speed responsive means, said actuatable means being operable by said other means in response to the movement of one of said speed responsive means for controlling the speed of one of said mechanisms, said actuatable means being also operable by said other means in response to the movement of the speed responsive means of the other of said mechanisms upon an overspeed of the said other mechanism relative to said one mechanism to control the speeds of both of said mechanisms.

2. A plurality of independently rotating devices, actuatable means to effect rotation of said devices, and control means to control said actuatable means to control overspeed of one of said devices relative to the other, said control means including separate concentrically arranged moveable speed responsive means connected to each of said devices for rotation therewith, motion transmitting means between said actuatable means and both of said speed responsive means, said actuatable means being operable by said motion transmitting means in response to the movement of one of said speed responsive means for controlling the speed of one of said devices, said actuatable means being also operable by said motion transmitting means in response to the movement of the speed responsive means of the other of said devices upon an overspeed of the said other device relative to said one device to control the speeds of both of said devices, said motion transmitting means including reciprocable means engageable and moveable by said one speed responsive means and having a portion thereon engageable by said other speed responsive means upon relative overspeed of said other device to independently operate said actuatable means by said other speed responsive device.

3. First and second independently rotating mechanisms having concentrically and telescopically mounted drive shafts, actuatable means to effect rotation of said drive shafts, and control means to control said actuatable means to control overspeed of the second relative to the first, said control means including concentrically and telescopically mounted moveable speed responsive means connected one to each of said mechanisms for rotation therewith, motion transmitting means connecting said actuatable means and both of said speed responsive means, said actuatable means being operable by said motion transmitting means in response to the movement of one of said speed responsive means for controlling the speed of the first mechanism, said actuatable means being also operable by said motion transmitting means in response to the movement of the speed responsive means of the second mechanism upon an overspeed of the said second mechanism relative to said first mechanism to control the speeds of both of said mechanisms, said motion transmitting means including reciprocable means engageable at one end and moveable by said one speed responsive means and engageable at its other end by said actuatable means, and additional means on said reciprocable means engaged by said second speed responsive means to move said actuatable means independently of said first speed responsive means at overspeeds of said second mechanism relative to said first.

4. An overspeed control mechanism for a dual spool turbo-machine having dual separately rotating turbine and compressor combinations and a combustion chamber between said turbines and compressors for driving said turbines by the products of combustion therein, comprising a source of fuel, connecting means connecting said source and said combustion chamber for the ignition of said fuel therein to drive said turbine combinations, and means to prevent the overspeed of one of said combinations with respect to the other, said means comprising speed responsive control means connected to each of said combinations for rotation therewith and moveable in response to centrifugal force thereon upon rotation of said combinations, a fuel control in said connecting means variably moveable between positions opening and closing said connecting means for controlling the supply of fuel to said chamber to control the speed of said combinations, and means between said fuel control and one of said combination speed responsive means and engaged thereby for moving said fuel control in a closing direction in response to an increase in rotation of said one combination, said last mentioned means being engaged also by the other of said combination control means and moved independently of said one combination control means to further close said connecting means and thereby decrease the speed of rotation of said combinations upon the attainment of a greater rotative speed of said other. combination than the one combination.

5. A plurality of independently rotating governing devices comprising first and second rotatable shafts, one concentrically and telescopically mounted within the other, first and second speed responsive means connected respectively to said shafts for rotation therewith and moveable in response to centrifugal force thereon, and other means engaged and moveable axially by both of said speed responsive means, said other means having portions engageable and moveable by said second speed responsive means independently of said first upon overspeed of said second shaft relative to said first.

6. Dual independently rotating mechanisms, actuable means to effect rotation of said mechanisms, and control means to control said actuatable means to control overspeed of one of said mechanisms relative to the other, said control means including separate moveable speed responsive means connected to each of said mechanisms for rotation therewith, other means connecting said actuatable means and both of said said speed responsive means, said actuatable means being operable by said other means in response to the movement of one of said speed responsive means for maintaining the speed of one of said mechanismn at a predetermined setting, said actuatable means being also operable by said other means in response to the movement of the speed responsive means of the other of said mechanisms upon an overspeed of the said other mechanism relative to the speed of said one mechanism to control the speeds of both of said mechanisms.

7. An overspeed control mechanism for a turbo-machine a plurality of separately rotating turbine and compressor combinations and a combustion chamber between the turbines and compressors for driving said turbines by the products of combustion therein, including, a source of fuel, connecting means connecting said source and said combustion chamber for the ignition of said fuel therein to drive said turbine combinations, and means to prevent the overspeed of one of said combinations with respect to another, said means comprising a plurality of speed responsive control means each connected to a separate one of said combinations for rotation therewith and movable in response to centrifugal force thereon upon rotation of said combinations, a fuel control in said connecting means variably movable between positions opening and closing said connecting means for controlling the supply of fuel to said chamber to control the speed of said combinations, and a common means between said fuel control and each of said plurality of speed responsive means engageable by each of said speed responsive means, said common means having a portion thereon engaged by one of said speed responsive means during the speeds of said combinations below the speed of one of said combinations for moving said fuel control in a closing direction in response to an increase in rotation of said one combination, said common means having another portion engaged by another of said plurality of speed responsive means upon the attainment of a greater rotative speed of another combination than the one combination for moving said fuel control by the other of said combination control means independently of the movement of said one combination speed responsive means to further close said connecting means and thereby decrease the speed of rotation of said combinations.

8. A plurality of independently rotating devices, actuatable means to control rotation of said devices, and means to control the actuation of said actuatable means to control overspeed of one of said devices relative to the other, said last mentioned means including separate concentrically arranged movable speed responsive means connected one to each of said devices for rotation therewith, motion transmitting means between said actuatable means and both of said speed responsive means, said actuatable means being operable by said motion transmitting means in response to the movement of one of said speed responsive means for controlling the speed of one of said devices, said actuatable means being also operable by said motion transmitting means in response to the movement of the speed responsive means of the other of said devices upon an overspeed of the said other device relative to said one device to control the speeds of both of said devices, said motion transmitting means including reciprocatable means having one end engaging said actuatable means and having its opposite end engaged by and movable by said one speed responsive means, means biasing said reciprocatable means into engagement with said one speed responsive means, said other speed responsive means having a portion movably surrounding a portion of said reciprocatable means, said portions being engaged upon overspeed of said other device relative to said one device to independently operate said actuatable means by said other speed responsive device.

References Cited in the file of this patent
UNITED STATES PATENTS
2,857,741     Evers ---------------- Oct. 28, 1958

UNITED STATES PATENT OFFICE
CERTIFICATE OF CORRECTION

Patent No. 3,032,985

May 8, 1962

William O. Alexander et al.

It is hereby certified that error appears in the above numbered patent requiring correction and that the said Letters Patent should read as corrected below.

Column 6, line 54, for "actuable" read -- actuatable --; line 61, strike out "said", first occurrence; line 65, for "mechanismn" read -- mechanisms --; same column, line 73, before "a" insert -- having --.

Signed and sealed this 28th day of August 1962.

(SEAL)
Attest:

ESTON G. JOHNSON
Attesting Officer

DAVID L. LADD
Commissioner of Patents